(12) United States Patent
Li et al.

(10) Patent No.: US 11,769,234 B2
(45) Date of Patent: Sep. 26, 2023

(54) METHODS AND APPARATUS FOR HISTOGRAM BASED TONE MAPPING

(71) Applicant: QUALCOMM Incorporated, San Diego, CA (US)

(72) Inventors: Min Li, San Diego, CA (US); Ike Ikizyan, San Diego, CA (US); Sudeep Ravi Kottilingal, San Diego, CA (US); Gopikrishnaiah Andandan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/065,334

(22) Filed: Oct. 7, 2020

(65) Prior Publication Data

US 2022/0108429 A1 Apr. 7, 2022

(51) Int. Cl.
*G06T 5/00* (2006.01)
*G06T 5/40* (2006.01)

(52) U.S. Cl.
CPC ............ *G06T 5/009* (2013.01); *G06T 5/40* (2013.01); *G06T 2207/10016* (2013.01);
(Continued)

(58) Field of Classification Search
CPC ............ G06K 9/00; G06T 5/00; G06T 9/00
See application file for complete search history.

(56) References Cited

U.S. PATENT DOCUMENTS

| 11,145,039 B2* | 10/2021 | Huang | G06T 5/007 |
| 2007/0014470 A1* | 1/2007 | Sloan | G06T 5/009 |
| | | | 382/162 |

(Continued)

FOREIGN PATENT DOCUMENTS

| EP | 1887517 A1 | 2/2008 |
| WO | 2015130797 A1 | 9/2015 |
| WO | 2018005705 A1 | 1/2018 |

OTHER PUBLICATIONS

I. R. Khan, S. Rahardja, M. M. Khan, M. M. Movania and F. Abed, "A Tone-Mapping Technique Based on Histogram Using a Sensitivity Model of the Human Visual System," in IEEE Transactions on Industrial Electronics, vol. 65, No. 4, pp. 3469-3479, Apr. 2018, doi: 10.1109/TIE.2017.2760247.*

(Continued)

*Primary Examiner* — Li Liu
(74) *Attorney, Agent, or Firm* — Procopio, Cory, Hargreaves & Savitch LLP

(57) ABSTRACT

The present disclosure relates to methods and devices for video or frame processing including an apparatus, e.g., a video or frame processor. In some aspects, the apparatus may receive a video stream including a plurality of frames, each of the plurality of frames including luminance information. The apparatus may also perform a histogram analysis on the luminance information for each of the plurality of frames. Additionally, the apparatus may determine whether a difference between the luminance information for each of the plurality of frames and a current luminance distribution is greater than a perceptual threshold. The apparatus may also calculate an updated tone mapping configuration based on the luminance information for a frame when the difference between the luminance information for the frame and the current luminance distribution is greater than the perceptual threshold.

40 Claims, 7 Drawing Sheets

(52) U.S. Cl.
CPC ............... *G06T 2207/20004* (2013.01); *G06T 2207/20072* (2013.01); *G06T 2207/20208* (2013.01)

(56) References Cited

U.S. PATENT DOCUMENTS

| | | | |
|---|---|---|---|
| 2009/0252412 A1* | 10/2009 | Matsushita | G06T 5/40 382/167 |
| 2010/0074553 A1 | 3/2010 | Choi et al. | |
| 2014/0078165 A1* | 3/2014 | Messmer | H04N 1/603 345/589 |
| 2017/0330312 A1 | 11/2017 | Nam | |
| 2019/0394384 A1 | 12/2019 | Yamamoto et al. | |

OTHER PUBLICATIONS

Guthier B., et al., "Flicker Reduction in Tone Mapped High Dynamic Range Video", Proceedings of Spie, vol. 7866, Jan. 23, 2011 (Jan. 23, 2011), pp. 78650C, XP055061689, 78 Pages, ISSN: 0277-786X, DOI: 10.1117/12.872449, pp. 1-8.

International Search Report and Written Opinion—PCT/US2021/049697—ISA/EPO—dated Dec. 21, 2021.

Koz A., et al., "Optimized Tone Mapping with Perceptually uniform Luminance Values for Backward-Compatible High Dynamic Range Video Compression", 2012 Visual Communications and Image Processing, Nov. 1, 2012 (Nov. 1, 2012), pp. 1-6, XP055565612, DOI:10.1109/VCIP.2012.6410792, ISBN: 978-1-4673-4406-7, The whole document.

Stylianos P., "Tone Mapping Operator for High Dynamic Range Video", Jan. 1, 2017 (Jan. 1, 2017), pp. 1-63, XP055869759, Retrieved from the Internet: URL: https://open.library.ubc.ca/soa/clRcle/collections/ubctheses/24/items/1.0357252, [retrieved on Dec. 6, 2021], Abstract pp. 14-15, figures 3-1.

* cited by examiner

METHODS AND APPARATUS FOR HISTOGRAM BASED TONE MAPPING

TECHNICAL FIELD

The present disclosure relates generally to processing systems and, more particularly, to one or more techniques for video or frame processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a video processor, a frame processor, a video decoder, video processing hardware, video processing software, a display processing unit (DPU), a histogram, and/or any apparatus that can perform video or frame processing. The apparatus may receive a video stream including a plurality of frames, each of the plurality of frames including luminance information. The apparatus may also store the luminance information for each of the plurality of frames in at least one of a memory, a dynamic random access memory (DRAM), or a cache. The apparatus may also perform a histogram analysis on the luminance information for each of the plurality of frames. Additionally, the apparatus may calculate at least one of an average luminance of the luminance information or a peak luminance of the luminance information for each of the plurality of frames. The apparatus may also determine whether a difference between the luminance information for each of the plurality of frames and a current luminance distribution is greater than a perceptual threshold. The apparatus may also convert at least one of the average luminance or the peak luminance for each of the plurality of frames to a perceptually uniform domain. Moreover, the apparatus may perform a comparison between at least one of the average luminance or the peak luminance for the frame and at least one of an average luminance of the current luminance distribution or a peak luminance of the current luminance distribution. The apparatus may also calculate an updated tone mapping configuration based on the luminance information for a frame when the difference between the luminance information for the frame and the current luminance distribution is greater than the perceptual threshold. The apparatus may also skip calculating the updated tone mapping configuration when the difference between the luminance information for the frame and the current luminance distribution is less than or equal to the perceptual threshold.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
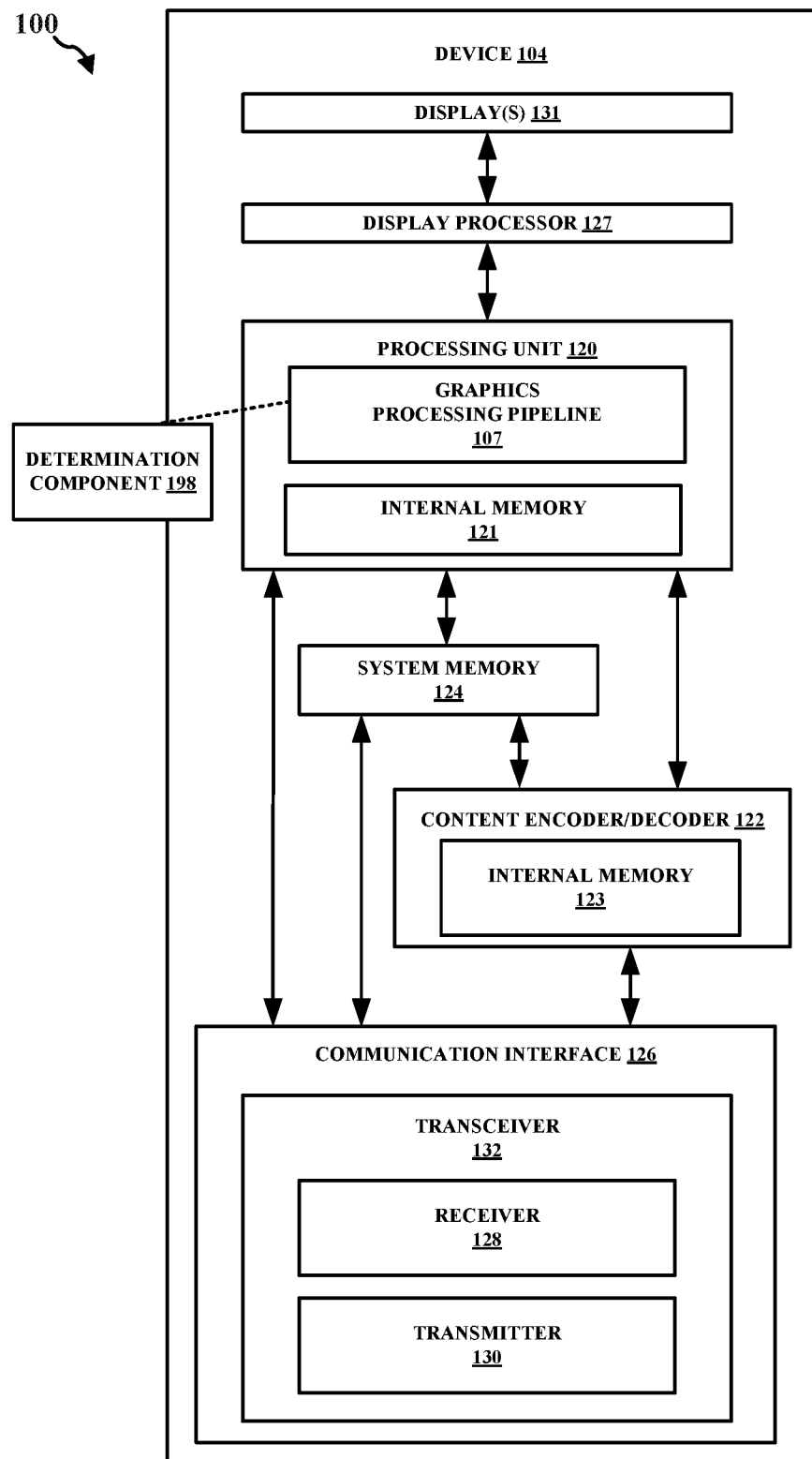
FIG. 1 is a block diagram that illustrates an example content generation system in accordance with one or more techniques of this disclosure.

Some aspects of video processing can include dynamic metadata or dynamic tone mapping, which can utilize tone mapping curves that are customized for each scene. Dynamic metadata can be used with certain types of content, e.g., high dynamic range (HDR) content or HDR10+. Additionally, dynamic metadata can help to avoid compromising the quality of converting an image to a display, such as with a fixed tone mapping. When a scene does not contain strong highlights and fits within a dynamic range of a display, tonal compression can be avoided and the creative intent can be faithfully reproduced. As the dynamic range of input content expands, tone mapping curves may be adapted for optimal rendering based on scene statistics and/or display panel capabilities. Dynamic metadata can help to optimally preserve creative intent, even with panels including a low dynamic range. Certain types of content, e.g., HDR10+, may include metadata that provides information on the luminance distribution for each frame or scene. However, the aforementioned benefits of dynamic metadata may not exist for content without dynamic metadata, e.g., HDR10 content. This type of content may include static metadata. Aspects of the present disclosure can provide dynamic metadata based quality for all types of display content. For instance, aspects of the present disclosure may provide dynamic metadata based quality for content without dynamic metadata. Also, aspects of the present disclosure can dynamically generate metadata during a video playback process. In order to do so, aspects of the present disclosure may include dynamically generated metadata during video playback using a histogram analysis.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to receive a video stream including a plurality of frames, each of the plurality of frames including luminance information. The determination component 198 can also be configured to store the luminance information for each of the plurality of frames in at least one of a memory, a dynamic random access memory (DRAM), or a cache. The determination component 198 can also be configured to perform a histogram analysis on the luminance information for each of the plurality of frames. The determination component 198 can also be configured to calculate at least one of an average luminance of the luminance information or a peak luminance of the luminance information for each of the plurality of frames. The determination component 198 can also be configured to determine whether a difference between the luminance information for each of the plurality of frames and a current luminance distribution is greater than a perceptual threshold. The determination component 198 can also be configured to convert at least one of the average luminance or the peak luminance for each of the plurality of frames to a perceptually uniform domain. The determination component 198 can also be configured to perform a comparison between at least one of the average luminance or the peak luminance for the frame and at least one of an average luminance of the current luminance distribution or a peak luminance of the current luminance distribution. The determination component 198 can also be configured to calculate an updated tone mapping configuration based on the luminance information for a frame when the difference between the luminance information for the frame and the current luminance distribution is greater than the perceptual threshold. The determination component 198 can also be configured to skip calculating the updated tone mapping configuration when the difference between the luminance information for the frame and the current luminance distribution is less than or equal to the perceptual threshold.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
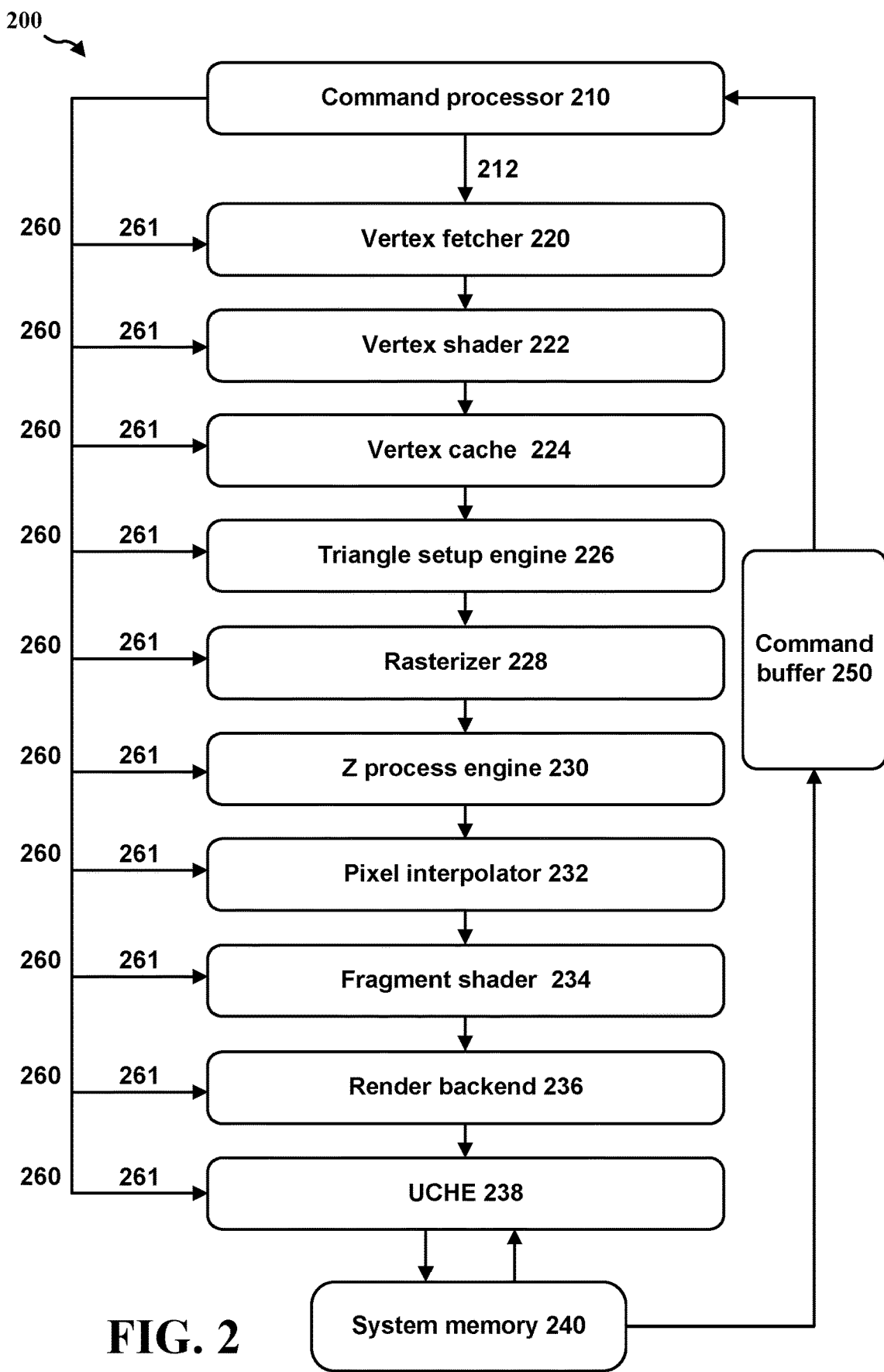
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information for each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Some aspects of video processing can include dynamic metadata or dynamic tone mapping, which can utilize tone mapping curves that are customized for each scene. Dynamic metadata can be used with certain types of content, e.g., high dynamic range (HDR) content or HDR10+. Additionally, dynamic metadata can help to avoid compromising the quality of converting an image to a display, such as with a fixed tone mapping. For instance, in dynamic metadata, each frame arrives with instructions in the form of metadata instructing how to optimally tone map the next frame or scene.

Figure 3A:
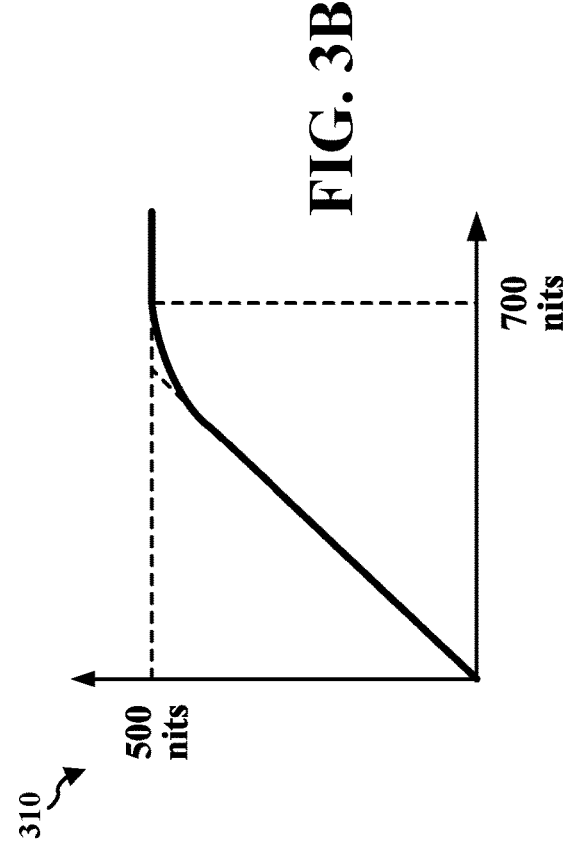
FIGS. 3A-3C illustrate example graphs illustrating input scene brightness versus display brightness in accordance with one or more techniques of this disclosure.
Figure 3B:
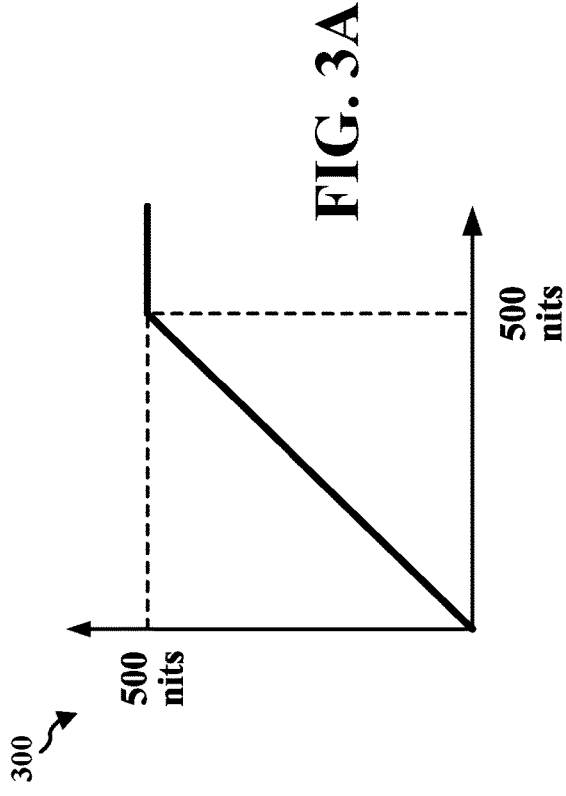
Figure 3C:
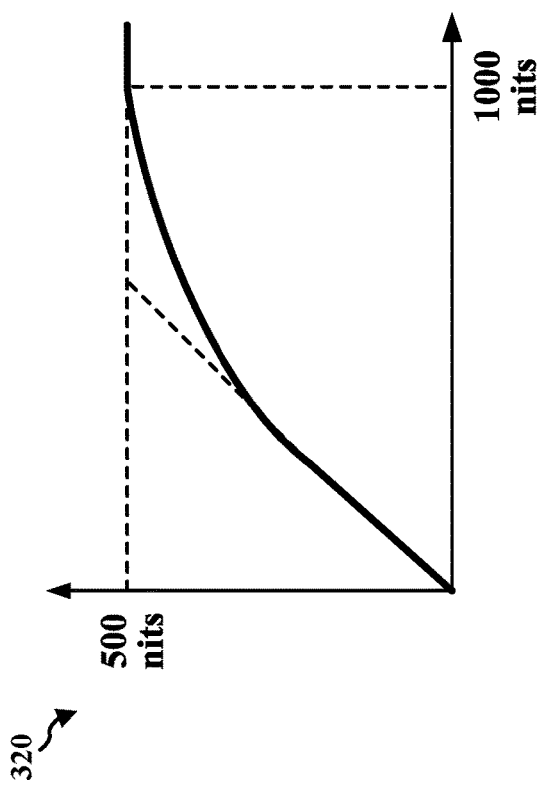

FIGS. 3A-3C illustrate graphs 300, 310, and 320, respectively, illustrating input scene brightness (x-axis) versus display brightness (y-axis). The brightness for both the input scene and the display is measured in nits, where 1 nit corresponds to the brightness of 1 candela per square meter ($cd/m^2$). FIG. 3A shows graph 300 of a fixe d tone mapping of an input scene brightness (up to 500 nits) compared to a display brightness (up to 500 nits). FIG. 3B illustrates graph 310 of a dynamic tone mapping of an input scene brightness (up to 700 nits) compared to a display brightness (up to 500 nits). FIG. 3C depicts graph 320 of a dynamic tone mapping of an input scene brightness (up to 1000 nits) compared to a display brightness (up to 500 nits).

As shown in FIG. 3A, when a scene does not contain strong highlights and fits within a dynamic range of a display, tonal compression can be avoided and creative intent can be faithfully reproduced. As shown in FIGS. 3B and 3C, as the dynamic range of input content expands, tone mapping curves may be adapted for optimal rendering based on scene statistics and/or panel capabilities. Dynamic metadata can help to optimally preserve creative intent, even with panels including a low dynamic range. Certain types of content, e.g., HDR10+, may include metadata that provides information on the luminance distribution for each frame or scene.

However, the aforementioned benefits of dynamic metadata may not exist for content without dynamic metadata, e.g., HDR10 content. This type of content may include static metadata. Based on the above, it may be beneficial to provide dynamic metadata based quality for all types of display content. For instance, it may be beneficial to provide dynamic metadata based quality for content without dynamic metadata. It may also be beneficial to dynamically generate metadata during a video playback process.

Aspects of the present disclosure can provide dynamic metadata based quality for all types of display content. For instance, aspects of the present disclosure may provide dynamic metadata based quality for content without dynamic metadata. Also, aspects of the present disclosure can dynamically generate metadata during a video playback process. In order to do so, aspects of the present disclosure may include dynamically generated metadata during video playback using a histogram analysis.

As mentioned above, HDR content with dynamic metadata, e.g., HDR10+, may look superior to content without dynamic metadata, e.g., static HDR10. Aspects of the present disclosure may achieve a dynamic picture quality for a wide variety of HDR content, even HDR content without dynamic metadata. For instance, aspects of the present disclosure may generate dynamic metadata on-the-fly or dynamically generate the metadata during video playback using a histogram analysis. In addition, some aspects of the present disclosure can include temporal filtering. For example, temporal filtering may reduce or minimize power consumption by eliminating unnecessary computations when luminance changes are less than a perceptual threshold.

Some aspects of the present disclosure can generate metadata for video stream content that lacks dynamic metadata. In order to do so, the present disclosure can analyze each of the incoming frames in a video stream and then generate metadata based on the individual frames. This individual frame metadata can be generated on-the-fly for each frame using a histogram analysis. Aspects of the present disclosure can also use a temporal filtering technique to minimize the power consumption for computing the tone mappings on a per-frame basis.

Figure 4:
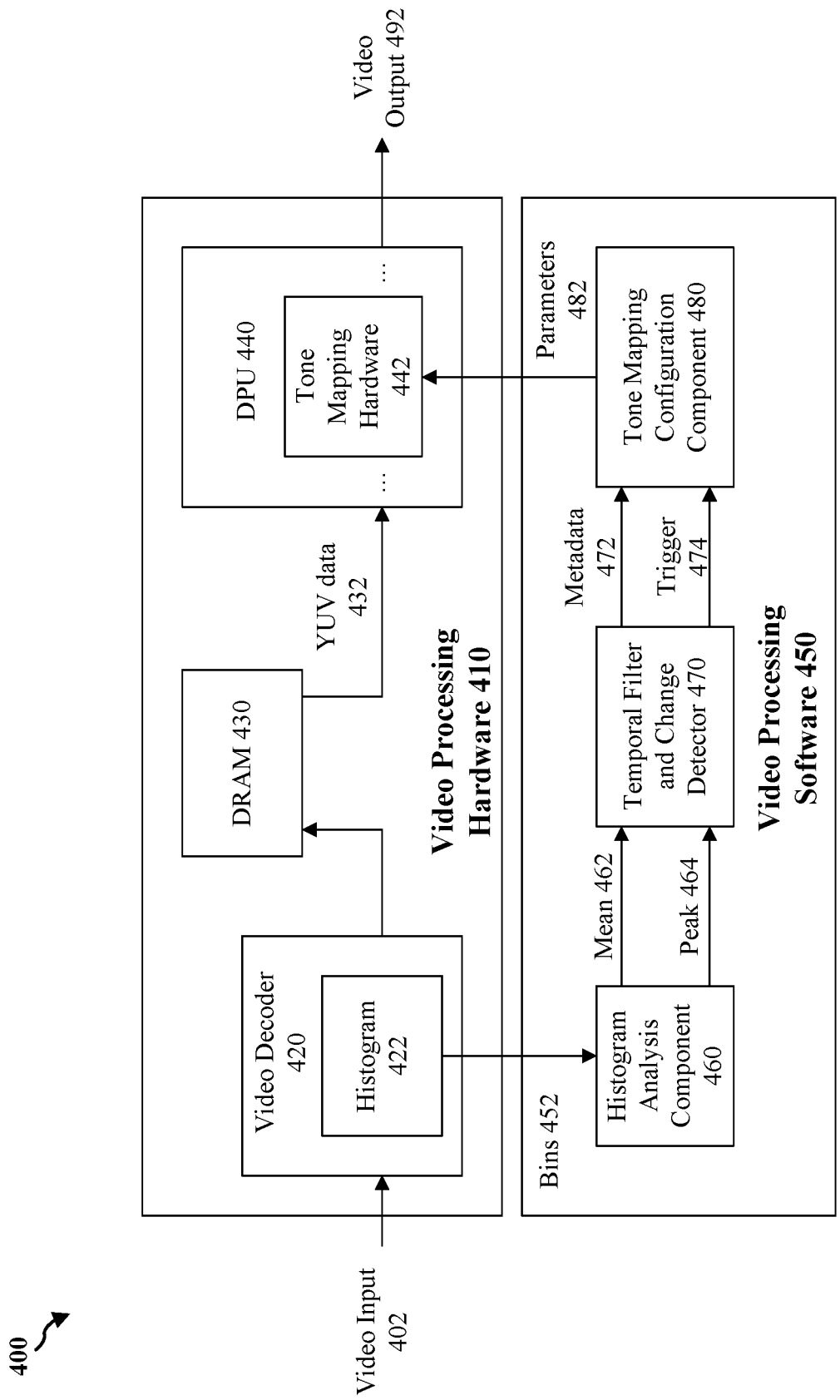
FIG. 4 illustrates an example diagram of display processing components in accordance with one or more techniques of this disclosure.

FIG. 4 illustrates diagram 400 of a number of components for display processing. As shown in FIG. 4, diagram 400 includes video processing hardware 410, which includes video decoder 420, histogram 422, DRAM 430, display processing unit (DPU) 440, and tone mapping hardware 442. Diagram 400 also includes video processing software 450, which includes histogram analysis component 460, temporal filter and change detector 470, and tone mapping configuration component 480. As shown in FIG. 4, diagram 400 also includes video input 402, luminance (Y) chrominance (UV) (YUV) data 432, bins 452, mean luminance 462, peak luminance 464, metadata 472, trigger 474, parameters 482, and video output 492.

As shown in FIG. 4, aspects of the present disclosure can include a histogram 422, e.g., a luma (Y') histogram, in video decoder 420. When the compressed video stream or bitstream in video input 402 is decompressed at the video decoder 420, the histogram 422 can provide luminance distribution information. Based on a histogram analysis, e.g., performed at histogram 422 and/or histogram analysis component 460, the present disclosure can derive metadata, such as the average brightness and/or the peak brightness of the luminance distribution information. So aspects of the present disclosure can generate metadata on a per-frame bases using histogram 422 in video processing hardware 410. Accordingly, the present disclosure can intake a video stream and generate metadata on a frame-by-frame basis for the video stream.

As depicted in FIG. 4, the compressed video bitstream or video input 402 can be input from a network to video decoder 420. As each of the frames in the video stream are decompressed at the video decoder 420, the frames may be stored in dynamic random access memory (DRAM) 430. In some aspects, at the same time that the frames are stored in DRAM 430, the present disclosure can collect a histogram for the luminance distribution for each frame, such as at histogram 422.

Once a frame is stored in the DRAM 430, the display processing unit (DPU) 440 can retrieve the frame data from the DRAM 430, such as uncompressed luminance (Y) chrominance (UV) (YUV) data 432, e.g., 10-bit YUV 4:2:0 data or perceptual quantizer (PQ) gamma BT2020 gamut data. The display processing unit 440 can then perform a number of different operations, such as scaling, sharpening, detail enhancement, or the like. The present disclosure can also perform a tone enhancement with the tone mapping hardware 442. For instance, once the tone mapping is defined, the hardware 410 can transform each of the incoming pixels in a frame using the tone mapping hardware 442 and then output new pixels, e.g., at video output 492. In some instances, if a new tone mapping is not performed or selected, this process can be performed by the hardware 410 without any further intervention from the software 450.

In some aspects of the present disclosure, if a new tone mapping is calculated or performed, the software 450 can be utilized in the process. Moreover, the software 450 can analyze the statistics of an incoming frame, make some decisions regarding the tone mapping, and/or update the tone mapping hardware configuration. The tone mapping hardware 442 can then transform subsequent pixels in each frame without any further software intervention. So the hardware 410 can receive the compressed bitstream, e.g., video input 402, and then determine luminance information for each of the frames based on a histogram analysis, e.g., at histogram 422 and/or histogram analysis component 460. Also, software 450 can call or interrogate the histograms in the video decoder 420, e.g., via histogram analysis component 460, and retrieve the bin values for analysis. The bins 452 can include a number of different bins, e.g., 1024 bins. As such, the present disclosure can perform a histogram analysis on the luminance information in each frame.

As shown in FIG. 4, once the histogram analysis is performed on the luminance information in each frame, e.g., at histogram analysis component 460, the mean luminance 462 and the peak luminance 464 of the luminance information for each frame can be extracted. For instance, during the histogram analysis, e.g., at histogram analysis component 460, the average or peak luminance for each frame can be computed based on the luminance information. This mean luminance 462 and peak luminance 464 can then be sent to the temporal filter and change detector 470. The temporal filter 470 may determine whether the current frame includes a visually significant change from previous frames. The temporal filter and change detector 470 may then send metadata 472 and/or trigger 474 to the tone mapping configuration component 480.

In some aspects, if the current frame includes a visually significant change compared to previous frames, the present disclosure can calculate an updated tone mapping configuration. This updated tone mapping configuration can be calculated at the tone mapping configuration component 480. If the current frame does not include a visually significant change from previous frames, the present disclosure can skip the calculation of an updated tone mapping configuration. For example, the calculation of an updated tone mapping configuration may utilize a high amount of power, so if the current frame is similar to previous frames, the present disclosure can save power by not calculating an updated tone mapping configuration.

As shown in FIG. 4, the temporal filter and change detector 470 may help to determine whether a new scene is changed enough to warrant the generation of a new transform configuration or transform table. If a new transform configuration or table is generated, the table entries, e.g., parameters 482, can be sent to the display processing unit 440 or tone mapping hardware 442. The tone mapping hardware 442 can then process pixels based on these table entries. Finally, after the aforementioned steps, the red (R) green (G) blue (B) (RGB) color data for the frame can be sent to the display, e.g., as video output 492.

Figure 5:
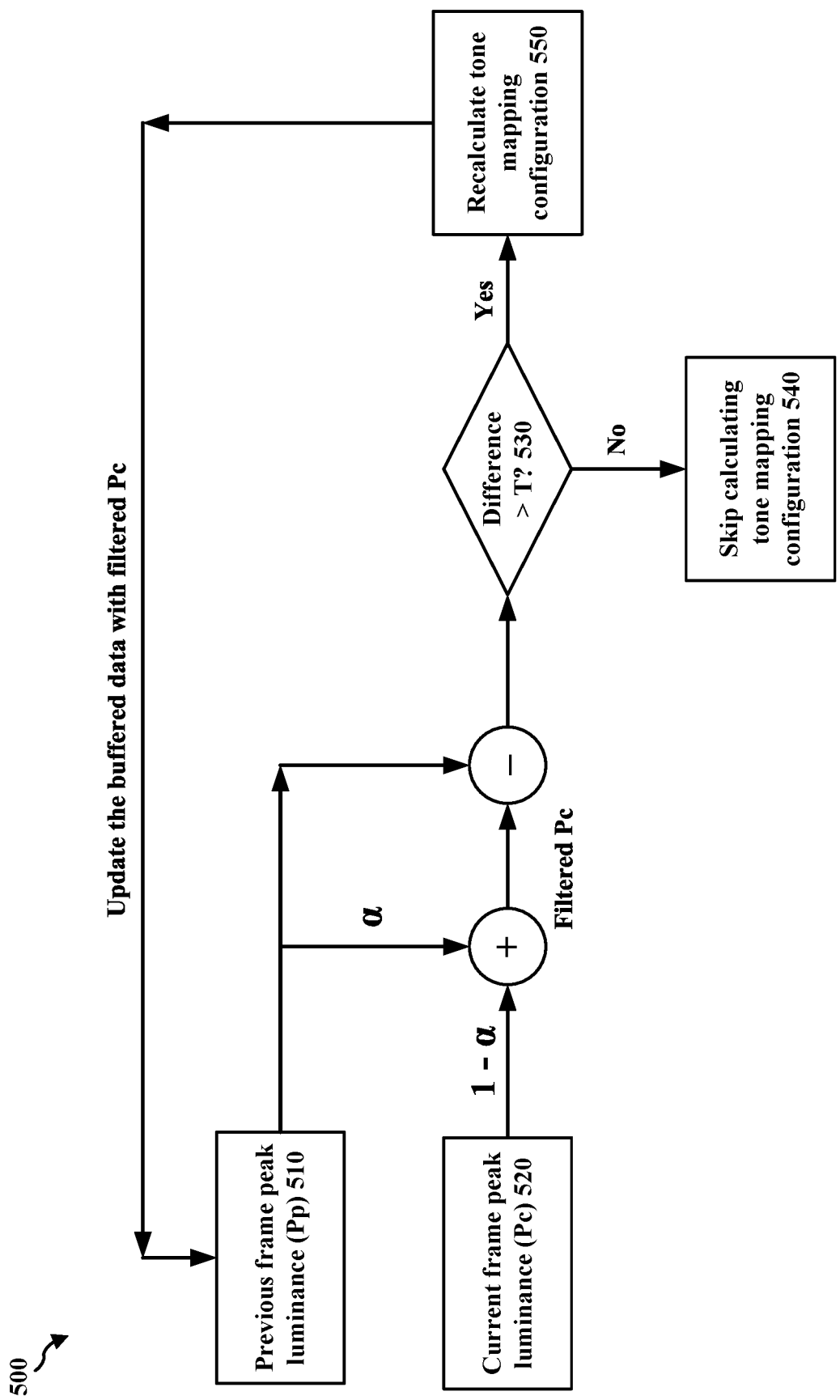
FIG. 5 illustrates an example diagram of temporal filter processing in accordance with one or more techniques of this disclosure.

FIG. 5 illustrates diagram 500 of processing at a temporal filter. As shown in FIG. 5, diagram 500 includes previous frame peak luminance (Pp) 510 and current frame peak luminance (Pc) 520. Diagram 500 also includes a number of steps, such as difference computation step 530, skip calculating tone mapping configuration step 540, and recalculate tone mapping configuration step 550.

FIG. 5 shows the processing performed by the aforementioned temporal filter, e.g., temporal filter 470, which is used for power optimization. FIG. 5 depicts the process of an adaptive filter, e.g., temporal filter 470, based on the aforementioned histogram statistics, e.g., a peak luminance 464 and/or a mean luminance 462. For instance, FIG. 5 illustrates the process for the peak luminance of a current frame, e.g., peak luminance 464, compared to the peak luminance of a previous frame. This same process can be performed for the mean luminance of a current frame, e.g., mean luminance 462, compared to the mean luminance of a previous frame.

As shown in FIG. 5, the peak luminance of a current frame (Pc) 520 can be blended with, or added to, the peak luminance of a previous frame (Pp) 510, e.g., the frame when the tone mapping was last updated. Based on this blending, the present disclosure can make a determination whether the difference between Pc and Pp is different enough to warrant an updated tone mapping configuration. As shown in FIG. 5, Pp 510 can be multiplied by an adaptivity component ($\alpha$) and Pc 520 can be multiplied by (1-$\alpha$). These values can then be added together to produce a blended value, [Pp*$\alpha$]+[Pc*(1-$\alpha$)]. The blended value, [Pp*$\alpha$]+[Pc*(1-$\alpha$)], can then be subtracted from the incumbent value, Pp 510, to produce a difference. If the difference exceeds a perceptual threshold (T), e.g., which may be determined at step 530, then an updated tone mapping calculation may be triggered, e.g., at recalculate tone mapping configuration step 550. As shown in FIG. 5, when the tone mapping configuration is recalculated, the buffered data can be updated with a filtered value of Pc. If the difference is less than the perceptual threshold (T), e.g., determined at step 530, then an updated tone mapping calculation may be skipped, e.g., at skip calculating tone mapping configuration step 540.

As shown in FIG. 5, aspects of the present disclosure may avoid a costly computation of a new tone mapping configuration each time there is a new histogram for a next frame. For instance, the temporal filter depicted in FIG. 5 can trigger tone mapping configuration updates when changes in the histogram statistics exceed a perceptual threshold. Also, the temporal filter depicted in FIG. 5 can save power by skipping the calculation of an updated tone mapping configuration when changes in the histogram statistics are less than or equal to the perceptual threshold. The temporal filter can operate in a log-nits domain (similar to a perceptual quantizer (PQ)) in order to achieve perceptual uniformity with a single threshold, T. As indicated above, a nit corresponds to the brightness of 1 candela per square meter ($cd/m^2$). Additionally, filtering logic similar to the logic in FIG. 5 may also be applied to content mean luminance levels or a current frame mean luminance. In some aspects, the aforementioned process can also reduce power for video streams, e.g., HDR10+ streams, when the metadata is changing each frame, e.g., in camcorder use cases.

Figure 6:
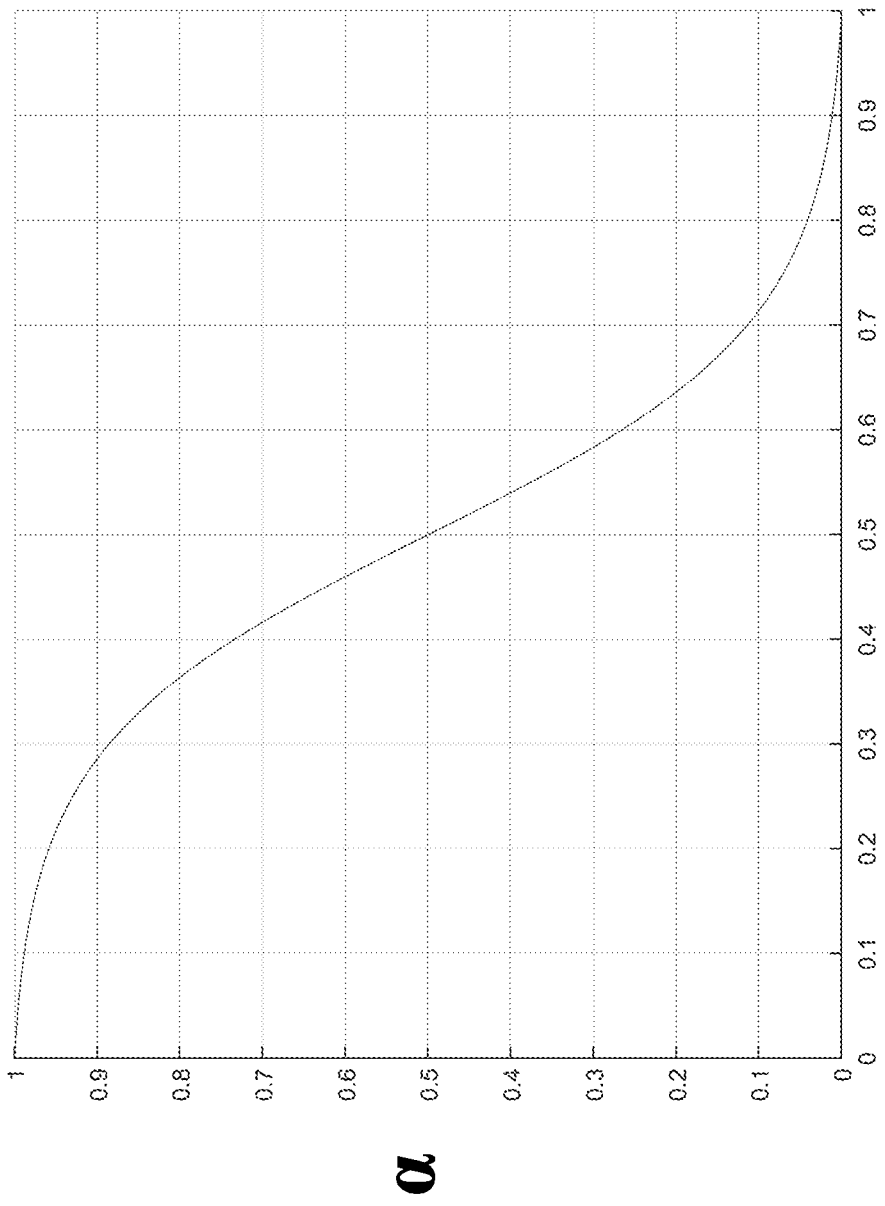
FIG. 6 illustrates an example graph illustrating a peak difference versus an adaptivity component in accordance with one or more techniques of this disclosure.

FIG. 6 illustrates graph 600 illustrating a peak difference (|Pc−Pp|) versus an adaptivity component ($\alpha$). As shown in FIG. 6, the peak difference can be equal to the absolute difference between the current frame peak luminance (Pc) and the previous frame peak luminance (Pp). Further, graph

600 depicts that as the peak difference increases, the adaptivity component (α) may decrease.

The aforementioned temporal filters of the present disclosure can include a number of benefits or advantages. For instance, the temporal filters of the present disclosure may significantly reduce the recalculation rates for tone mapping configurations. For example, temporal filters of the present disclosure may result in a tone mapping recalculation rate of 0.3% for certain formats, e.g., HDR10+, for a certain number of frames, e.g., 390 frames. Additionally, temporal filters of the present disclosure may result in tone mapping calculation rates of 4.9%, 0.6%, 7.4%, and 9.5% for certain formats, e.g., HDR10, for a certain number of frames, e.g., 5266, 5443, 6063, and 1000 frames, respectively. In some instances, without utilising the temporal filter of the present disclosure, tone mapping recalculation rates may be close to 100%, i.e., recalculating at each frame.

Additionally, temporal filters of the present disclosure may provide novelty and usefulness for tone mapping recalculations. As indicated herein, temporal filters may be utilized in the context of video or display dynamics. Temporal filters may be used to control transition rates and/or suppress flicker artifacts. Further, the use of the aforementioned temporal filters may include novel ways in which to reduce or minimize display processing power. For instance, the present disclosure may utilize a novel perceptually uniform change detection and thresholding process. Also, filtering in a log-nits domain may better match the sensitivity of a human visual system to changes in luminance information.

FIGS. 3A-6 illustrate examples of the aforementioned methods and processes for histogram based tone mapping. As shown in FIGS. 3A-6, aspects of the present disclosure, e.g., video processors herein, can perform a number of different steps or processes for histogram based tone mapping in order to reduce the amount of power consumed. For instance, video processors herein may skip calculating an updated tone mapping configuration when a difference between a previous frame luminance and a current frame luminance is greater than a perceptual threshold.

Video processors herein, e.g., hardware 410, may receive a video stream including a plurality of frames, e.g., video input 402, where each of the plurality of frames includes luminance information. In some instances, the video stream, e.g., video input 402, may be a compressed bitstream.

Video processors herein, e.g., hardware 410, may also store the luminance information for each of the plurality of frames in at least one of a memory, a dynamic random access memory (DRAM), e.g., DRAM 430, or a cache.

Additionally, video processors herein, e.g., software 450 or hardware 410, may perform a histogram analysis on the luminance information for each of the plurality of frames. In some aspects, the luminance information for each of the plurality of frames may be derived or extracted from at least one of a hardware histogram collection process or dynamic metadata.

Video processors herein, e.g., software 450, may also calculate at least one of an average luminance of the luminance information, e.g., mean luminance 462, or a peak luminance of the luminance information, e.g., peak luminance 464, for each of the plurality of frames.

Video processors herein, e.g., software 450, may also determine whether a difference between the luminance information for each of the plurality of frames and a current luminance distribution is greater than a perceptual threshold, e.g., at temporal filter 470. As shown in FIG. 5, this process may be performed by step 530.

Video processors herein, e.g., software 450, may also convert at least one of the average luminance, e.g., mean luminance 462, or the peak luminance, e.g., peak luminance 464, for each of the plurality of frames to a perceptually uniform domain. In some instances, the perceptually uniform domain may be log-nits.

Video processors herein, e.g., software 450, may also perform a comparison between at least one of the average luminance, e.g., mean luminance 462, or the peak luminance, e.g., peak luminance 464, for the frame and at least one of an average luminance of the current luminance distribution or a peak luminance of the current luminance distribution. In some aspects, the comparison may include calculating an absolute difference between at least one of the average luminance or the peak luminance for the frame and at least one of the average luminance of the current luminance distribution or the peak luminance of the current luminance distribution e.g., at tone mapping configuration component 480. The absolute difference may be compared to the perceptual threshold. For example, this process may be performed in step 530 of FIG. 5. Further, the comparison may be performed with an adaptive temporal filter. In some instances, the adaptive temporal filter may be an adaptive recursive filter including an adaptivity component (α), e.g., adaptivity component (α) in FIG. 5.

Video processors herein, e.g., software 450 or hardware 410, may also calculate an updated tone mapping configuration based on the luminance information for a frame when the difference between the luminance information for the frame and the current luminance distribution is greater than the perceptual threshold, e.g., at tone mapping configuration component 480. For example, this process may be performed in step 550 of FIG. 5.

Video processors herein, e.g., software 450 or hardware 410, may also skip calculating the updated tone mapping configuration when the difference between the luminance information for the frame and the current luminance distribution is less than or equal to the perceptual threshold e.g., at tone mapping configuration component 480. For example, this process may be performed in step 540 of FIG. 5. In some aspects, skipping calculating the updated tone mapping configuration may be associated with a reduction in an amount of power utilized.

Figure 7:
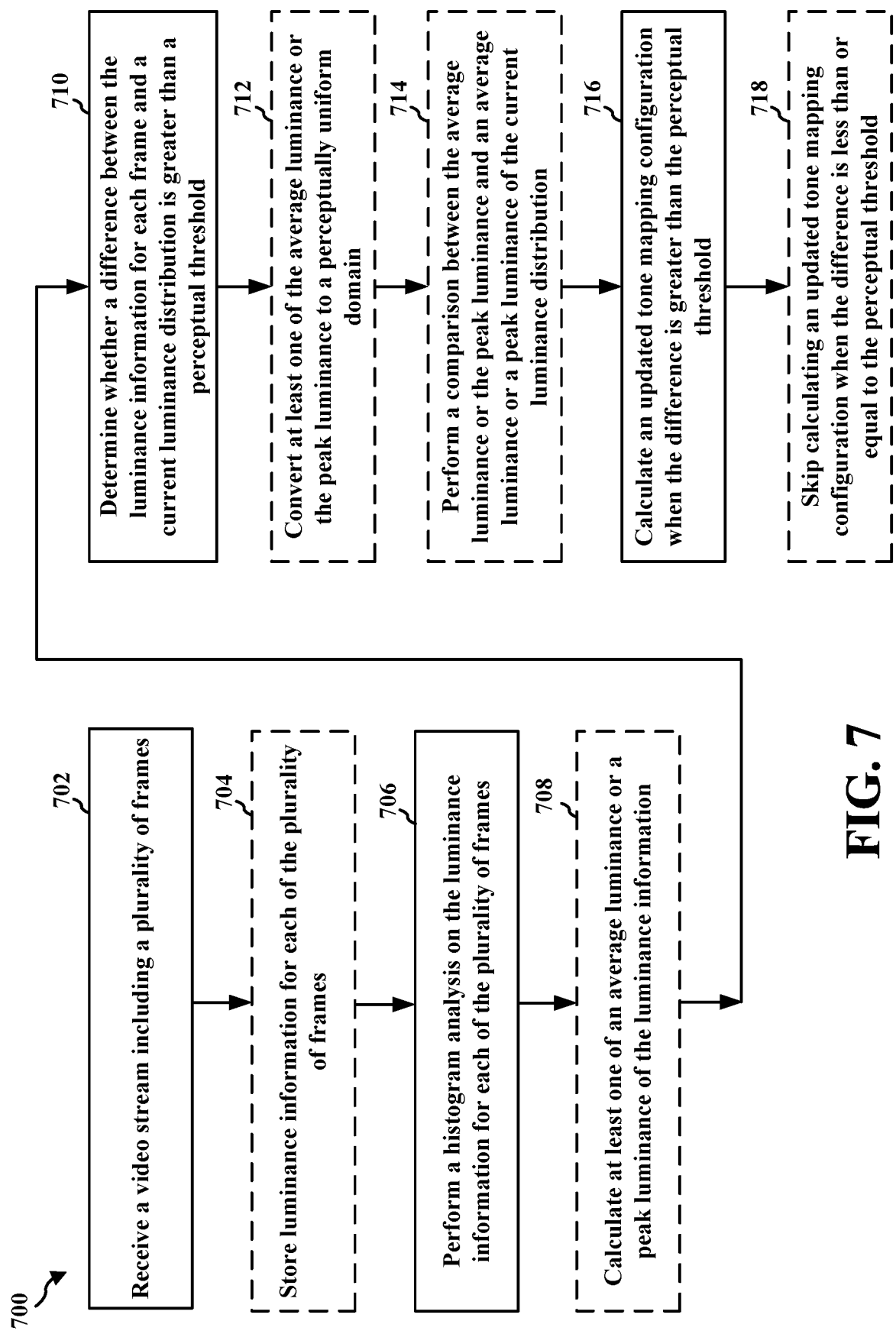
FIG. 7 illustrates an example flowchart of an example method in accordance with one or more techniques of this disclosure.

FIG. 7 illustrates a flowchart 700 of an example method in accordance with one or more techniques of this disclosure. The method may be performed by an apparatus such as a video processor, a frame processor, a video decoder, video processing hardware, video processing software, a display processing unit (DPU), a histogram, or an apparatus for video or frame processing.

At 702, the apparatus may receive a video stream including a plurality of frames, each of the plurality of frames including luminance information, as described in connection with the examples in FIGS. 3A, 3B, 3C, 4, 5, and 6. In some instances, the video stream may be a compressed bitstream, as described in connection with the examples in FIGS. 3A, 3B, 3C, 4, 5, and 6.

At 704, the apparatus may store the luminance information for each of the plurality of frames in at least one of a memory, a dynamic random access memory (DRAM), or a cache, as described in connection with the examples in FIGS. 3A, 3B, 3C, 4, 5, and 6.

At 706, the apparatus may perform a histogram analysis on the luminance information for each of the plurality of frames, as described in connection with the examples in FIGS. 3A, 3B, 3C, 4, 5, and 6. In some aspects, the luminance information for each of the plurality of frames may be derived or extracted from at least one of a hardware histogram collection process or dynamic metadata, as described in connection with the examples in FIGS. 3A, 3B, 3C, 4, 5, and 6.

At 708, the apparatus may calculate at least one of an average luminance of the luminance information or a peak luminance of the luminance information for each of the plurality of frames, as described in connection with the examples in FIGS. 3A, 3B, 3C, 4, 5, and 6.

At 710, the apparatus may determine whether a difference between the luminance information for each of the plurality of frames and a current luminance distribution is greater than a perceptual threshold, as described in connection with the examples in FIGS. 3A, 3B, 3C, 4, 5, and 6.

At 712, the apparatus may convert at least one of the average luminance or the peak luminance for each of the plurality of frames to a perceptually uniform domain. In some instances, the perceptually uniform domain may be log-nits, as described in connection with the examples in FIGS. 3A, 3B, 3C, 4, 5, and 6.

At 714, the apparatus may perform a comparison between at least one of the average luminance or the peak luminance for the frame and at least one of an average luminance of the current luminance distribution or a peak luminance of the current luminance distribution, as described in connection with the examples in FIGS. 3A, 3B, 3C, 4, 5, and 6. In some aspects, the comparison may include calculating an absolute difference between at least one of the average luminance or the peak luminance for the frame and at least one of the average luminance of the current luminance distribution or the peak luminance of the current luminance distribution, as described in connection with the examples in FIGS. 3A, 3B, 3C, 4, 5, and 6. The absolute difference may be compared to the perceptual threshold, as described in connection with the examples in FIGS. 3A, 3B, 3C, 4, 5, and 6. Further, the comparison may be performed with an adaptive temporal filter, as described in connection with the examples in FIGS. 3A, 3B, 3C, 4, 5, and 6. In some instances, the adaptive temporal filter may be an adaptive recursive filter including an adaptivity component ($\alpha$), as described in connection with the examples in FIGS. 3A, 3B, 3C, 4, 5, and 6.

At 716, the apparatus may calculate an updated tone mapping configuration based on the luminance information for a frame when the difference between the luminance information for the frame and the current luminance distribution is greater than the perceptual threshold, as described in connection with the examples in FIGS. 3A, 3B, 3C, 4, 5, and 6.

At 718, the apparatus may skip calculating the updated tone mapping configuration when the difference between the luminance information for the frame and the current luminance distribution is less than or equal to the perceptual threshold, as described in connection with the examples in FIGS. 3A, 3B, 3C, 4, 5, and 6. In some aspects, skipping calculating the updated tone mapping configuration may be associated with a reduction in an amount of power utilized, as described in connection with the examples in FIGS. 3A, 3B, 3C, 4, 5, and 6.

In one configuration, a method or apparatus for graphics processing is provided. The apparatus may be a video processor, a frame processor, a video decoder, video processing hardware, video processing software, a display processing unit (DPU), a histogram, or some other processor that can perform video or frame processing. In one aspect, the apparatus may be the processing unit 120 within the device 104, or may be some other hardware within device 104 or another device. The apparatus may include means for receiving a video stream including a plurality of frames, each of the plurality of frames including luminance information. The apparatus may also include means for performing a histogram analysis on the luminance information for each of the plurality of frames. The apparatus may also include means for determining whether a difference between the luminance information for each of the plurality of frames and a current luminance distribution is greater than a perceptual threshold. The apparatus may also include means for calculating an updated tone mapping configuration based on the luminance information for a frame when the difference between the luminance information for the frame and the current luminance distribution is greater than the perceptual threshold. The apparatus may also include means for skipping calculating the updated tone mapping configuration when the difference between the luminance information for the frame and the current luminance distribution is less than or equal to the perceptual threshold. The apparatus may also include means for calculating at least one of an average luminance of the luminance information or a peak luminance of the luminance information for each of the plurality of frames. The apparatus may also include means for performing a comparison between at least one of the average luminance or the peak luminance for the frame and at least one of an average luminance of the current luminance distribution or a peak luminance of the current luminance distribution. The apparatus may also include means for converting at least one of the average luminance or the peak luminance for each of the plurality of frames to a perceptually uniform domain. The apparatus may also include means for storing the luminance information for each of the plurality of frames in at least one of a memory, a dynamic random access memory (DRAM), or a cache.

The subject matter described herein can be implemented to realize one or more benefits or advantages. For instance, the described video or frame processing techniques can be used by a video processor, a frame processor, a video decoder, video processing hardware, video processing software, a display processing unit (DPU), a histogram, or some other processor that can perform video or frame processing to implement the histogram based tone mapping techniques described herein. This can also be accomplished at a low cost compared to other video or frame processing techniques. Moreover, the video or frame processing techniques herein can improve or speed up video processing or execution. Further, the video or frame processing techniques herein can improve resource or data utilisation and/or resource efficiency. Additionally, aspects of the present disclosure can utilize histogram based tone mapping techniques in order to save power, improve processing time, reduce latency, and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of video processing, comprising:
   receiving a video stream including a plurality of frames, each of the plurality of frames including luminance information;
   performing a histogram analysis on the luminance information for each of the plurality of frames;
   calculating an average luminance of the luminance information for each of the plurality of frames based on the histogram analysis;
   storing the average luminance of the luminance information for each of the plurality of frames based on the histogram analysis in at least one of a memory, a dynamic random access memory (DRAM), or a cache;
   determining whether a difference between the average luminance of the luminance information for each of the plurality of frames and an average luminance of a current luminance distribution is greater than a perceptual threshold based on performing a comparison between the average luminance for the frame and the average luminance of the current luminance distribution; and
   calculating an updated tone mapping configuration based on the luminance information for the frame based on the difference between the average luminance of the luminance information for the frame and the average luminance of the current luminance distribution of each of the plurality of frames being greater than the perceptual threshold.

2. The method of claim 1, further comprising:
   skipping calculating the updated tone mapping configuration when the difference between the luminance information for the frame and the current luminance distribution is less than or equal to the perceptual threshold.

3. The method of claim 2, wherein skipping calculating the updated tone mapping configuration is associated with a reduction in an amount of power utilized.

4. The method of claim 1, further comprising:
   calculating a peak luminance of the luminance information for each of the plurality of frames.

5. The method of claim 4, further comprising:
   performing a comparison between the peak luminance for the frame and a peak luminance of the current luminance distribution.

6. The method of claim 5, wherein the comparison includes calculating an absolute difference between at least one of the average luminance or the peak luminance for the frame and at least one of the average luminance of the current luminance distribution or the peak luminance of the current luminance distribution.

7. The method of claim 6, wherein the absolute difference is compared to the perceptual threshold.

8. The method of claim 5, wherein the comparison is performed with an adaptive temporal filter.

9. The method of claim 8, wherein the adaptive temporal filter is an adaptive recursive filter including an adaptivity component ($\alpha$).

10. The method of claim 4, further comprising:
    converting at least one of the average luminance or the peak luminance for each of the plurality of frames to a perceptually uniform domain.

11. The method of claim 10, wherein the perceptually uniform domain is log-nits.

12. The method of claim 1, wherein the luminance information for each of the plurality of frames is derived or extracted from at least one of a hardware histogram collection process or dynamic metadata.

13. The method of claim 1, wherein the video stream is a compressed bitstream.

14. An apparatus for video processing, comprising:
    a memory; and
    at least one processor coupled to the memory and configured to:
    receive a video stream including a plurality of frames, each of the plurality of frames including luminance information;
    perform a histogram analysis on the luminance information for each of the plurality of frames;
    calculate an average luminance of the luminance information for each of the plurality of frames based on the histogram analysis;
    store the average luminance of the luminance information for each of the plurality of frames based on the histogram analysis in at least one of a memory, a dynamic random access memory (DRAM), or a cache;

determine whether a difference between the average luminance of the luminance information for each of the plurality of frames and an average luminance of a current luminance distribution is greater than a perceptual threshold based on a comparison between the average luminance for the frame and the average luminance of the current luminance distribution; and calculate an updated tone mapping configuration based on the luminance information for the frame based on the difference between the average luminance of the luminance information for the frame and the average luminance of the current luminance distribution of each of the plurality of frames being greater than the perceptual threshold.

15. The apparatus of claim 14, wherein the at least one processor is further configured to:

skip calculating the updated tone mapping configuration when the difference between the luminance information for the frame and the current luminance distribution is less than or equal to the perceptual threshold.

16. The apparatus of claim 15, wherein the skipped calculation of the updated tone mapping configuration is associated with a reduction in an amount of power utilized.

17. The apparatus of claim 14, wherein the at least one processor is further configured to:

calculate a peak luminance of the luminance information for each of the plurality of frames.

18. The apparatus of claim 17, wherein the at least one processor is further configured to:

perform a comparison between the peak luminance for the frame and a peak luminance of the current luminance distribution.

19. The apparatus of claim 18, wherein the comparison includes a calculation of an absolute difference between at least one of the average luminance or the peak luminance for the frame and at least one of the average luminance of the current luminance distribution or the peak luminance of the current luminance distribution.

20. The apparatus of claim 19, wherein the at least one processor is configured to compare the absolute difference to the perceptual threshold.

21. The apparatus of claim 18, wherein the at least one processor is configured to perform the comparison with an adaptive temporal filter.

22. The apparatus of claim 21, wherein the adaptive temporal filter is an adaptive recursive filter including an adaptivity component ($\alpha$).

23. The apparatus of claim 17, wherein the at least one processor is further configured to:

convert at least one of the average luminance or the peak luminance for each of the plurality of frames to a perceptually uniform domain.

24. The apparatus of claim 23, wherein the perceptually uniform domain is log-nits.

25. The apparatus of claim 14, wherein the luminance information for each of the plurality of frames is derived or extracted from at least one of a hardware histogram collection process or dynamic metadata.

26. The apparatus of claim 14, wherein the video stream is a compressed bitstream.

27. An apparatus for video processing, comprising:

means for receiving a video stream including a plurality of frames, each of the plurality of frames including luminance information;

means for performing a histogram analysis on the luminance information for each of the plurality of frames;

means for calculating an average luminance of the luminance information for each of the plurality of frames based on the histogram analysis;

means for storing the average luminance of the luminance information for each of the plurality of frames based on the histogram analysis in at least one of a memory, a dynamic random access memory (DRAM), or a cache;

means for determining whether a difference between the average luminance of the luminance information for each of the plurality of frames and an average luminance of a current luminance distribution is greater than a perceptual threshold based on a comparison between the average luminance for the frame and the average luminance of the current luminance distribution; and means for calculating an updated tone mapping configuration based on the luminance information for the frame based on the difference between the average luminance of the luminance information for the frame and the average luminance of the current luminance distribution of each of the plurality of frames being greater than the perceptual threshold.

28. The apparatus of claim 27, further comprising:

means for skipping calculating the updated tone mapping configuration when the difference between the luminance information for the frame and the current luminance distribution is less than or equal to the perceptual threshold.

29. The apparatus of claim 28, wherein skipping calculating the updated tone mapping configuration is associated with a reduction in an amount of power utilized.

30. The apparatus of claim 27, further comprising:

means for calculating a peak luminance of the luminance information for each of the plurality of frames.

31. The apparatus of claim 30, further comprising:

means for performing a comparison between the peak luminance for the frame and a peak luminance of the current luminance distribution.

32. The apparatus of claim 31, wherein the comparison includes calculating an absolute difference between at least one of the average luminance or the peak luminance for the frame and at least one of the average luminance of the current luminance distribution or the peak luminance of the current luminance distribution.

33. The apparatus of claim 32, wherein the absolute difference is compared to the perceptual threshold.

34. The apparatus of claim 31, wherein the comparison is performed with an adaptive temporal filter.

35. The apparatus of claim 34, wherein the adaptive temporal filter is an adaptive recursive filter including an adaptivity component ($\alpha$).

36. The apparatus of claim 30, further comprising:

means for converting at least one of the average luminance or the peak luminance for each of the plurality of frames to a perceptually uniform domain.

37. The apparatus of claim 36, wherein the perceptually uniform domain is log-nits.

38. The apparatus of claim 27, wherein the luminance information for each of the plurality of frames is derived or extracted from at least one of a hardware histogram collection process or dynamic metadata.

39. The apparatus of claim 27, wherein the video stream is a compressed bitstream.

40. A non-transitory computer-readable medium storing computer executable code for video processing, the code when executed by a processor causes the processor to:

receive a video stream including a plurality of frames, each of the plurality of frames including luminance information;

perform a histogram analysis on the luminance information for each of the plurality of frames;

calculate an average luminance of the luminance information for each of the plurality of frames based on the histogram analysis;

store the average luminance of the luminance information for each of the plurality of frames based on the histogram analysis in at least one of a memory, a dynamic random access memory (DRAM), or a cache;

determine whether a difference between the average luminance of the luminance information for each of the plurality of frames and an average luminance of a current luminance distribution is greater than a perceptual threshold based on a comparison between the average luminance for the frame and the average luminance of the current luminance distribution; and calculate an updated tone mapping configuration based on the luminance information for the frame based on the difference between the average luminance of the luminance information for the frame and the average luminance of the current luminance distribution of each of the plurality of frames being greater than the perceptual threshold.

* * * * *